United States Patent [19]
Goffe et al.

[11] 4,012,943
[45] Mar. 22, 1977

[54] MEASURING METHOD AND APPARATUS
[75] Inventors: Frederick William Frank Goffe, Broughton; Donald James Pilkington, Kettering, both of England
[73] Assignee: The Shoe & Allied Trades Research Association, England
[22] Filed: Oct. 10, 1975
[21] Appl. No.: 621,553
[30] Foreign Application Priority Data Oct. 10, 1974 United Kingdom ............ 44032/74

[52] U.S. Cl. .................................. 73/37.7; 33/121
[51] Int. Cl.² .................. G01B 13/20; G01B 13/04
[58] Field of Search ................. 73/37.5, 37.6, 37.7, 73/37.8; 33/121, 123, 124, DIG. 2

[56] References Cited
UNITED STATES PATENTS

| | | | |
|---|---|---|---|
| 1,158,310 | 10/1915 | Schulze | 33/121 |
| 2,387,379 | 10/1945 | Woodbury | 33/124 |
| 3,026,714 | 3/1962 | Evans et al. | 73/37.7 |
| 3,264,739 | 8/1966 | Berlinsky et al. | 33/123 |
| 3,451,258 | 6/1969 | Westbrook | 73/37.7 |
| 3,663,108 | 5/1972 | Yamamuro et al. | 73/37.5 X |
| 3,717,414 | 2/1973 | Hall et al. | 33/123 X |
| 3,762,211 | 10/1973 | Poulsen | 73/37.7 X |

*Primary Examiner*—Richard C. Queisser
*Assistant Examiner*—John S. Appleman
*Attorney, Agent, or Firm*—Lerner, David, Littenberg & Samuel

[57] ABSTRACT

A method and apparatus for measuring areas of workpieces, especially skins such as sheepskins in which the wool extends beyond the edges of the pelt, is provided. Air under pressure is supplied to a row of jet members and the skin to be measured is passed below the jet members. The pressure within the members is sensed, increase in this pressure indicating that the jet member is blocked off by the skin. By repeatedly counting how many of the jet members are blocked off, as the skin is passed underneath, a measure of the area of the skin is obtained. Since the wool does not interfere with the air issuing from the jet members, the measurement obtained represents the area of the pelt. In one alternative embodiment, a matrix of jet members is provided so that the area of the skin can be measured while it and the jet members are stationary relative to each other; in a further alternative embodiment, a single jet member is provided and this is caused to scan back and forth along a line transverse to which the skin is moved so that this jet member scans the whole area of the skin thus to enable a measure thereof to be obtained by detecting the time for which the single jet member is blocked by the skin.

13 Claims, 6 Drawing Figures

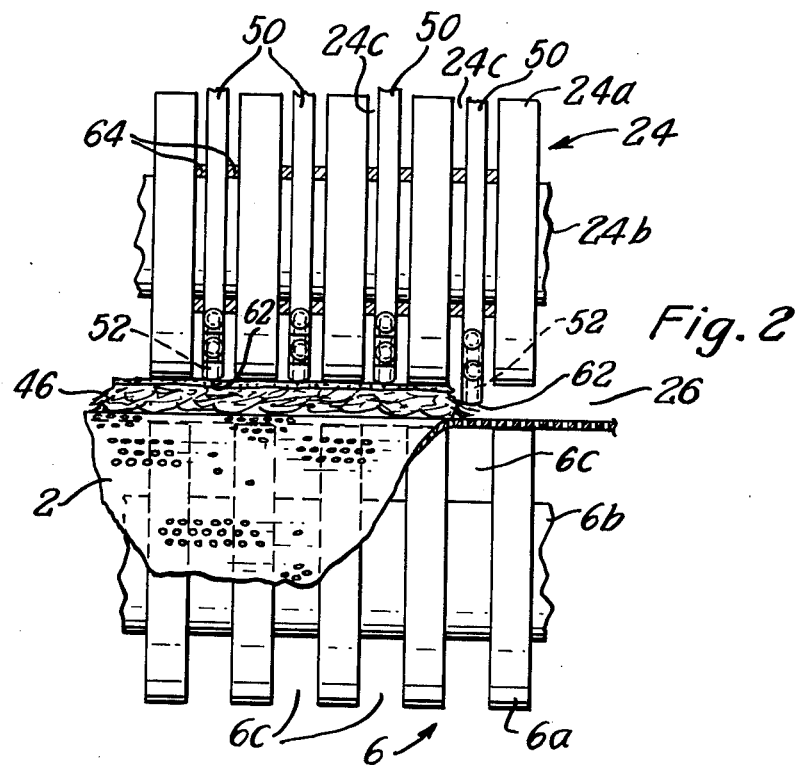
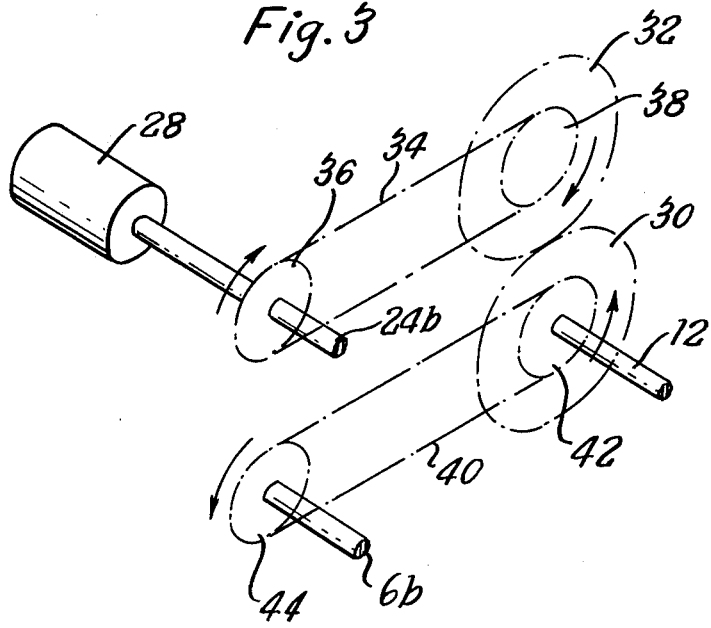

MEASURING METHOD AND APPARATUS

FIELD OF THE INVENTION

This invention relates to method and apparatus for measuring dimensions of objects, especially irregular shaped objects such as animal skins. The invention is especially applicable to the measurement of the area of such objects.

BACKGROUND TO THE INVENTION

Various different methods and apparatus for measurement of area have been proposed in the prior art. One such prior proposal involves moving the skin through a measuring apparatus which includes a plurality of photoelectric sensing devices which are arranged in a row which is transverse to the direction of movement of the skin so that as the skin moves through the apparatus, the device measures successive widths of the skin. The successive widths are integrated in a summing device so as to give a measure of the area. Such a method is disclosed in U.K. Pat. Specification No. 1,028,194. U.K. Pat. Specification Nos. 1,317,728, 1,165,227 and 922,545 each disclose a similar apparatus and method, but optical fibres are employed in a manner which makes it possible to employ a single photoelectric sensing device instead of the aforementioned plurality.

Whilst the abovementioned prior proposals may be satisfactory in many situations, a problem arises when the area of sheepskin is to be measured while the wool is still attached to the pelt. The problem is that it is the area of the pelt which is required to be measured, but the wool extends beyond the edges of the pelt with the result that, since photoelectric sensing devices cannot distinguish between the pelt and the wool, an erroneous measure of the area would be obtained. The invention aims to provide a method and apparatus in which this problem does not arise.

THE INVENTION

In one aspect, the invention provides a method and apparatus for measuring a dimension of an object, in which fluid pressure, preferably air pressure, is utilised for sensing the object. In the case where the object is a sheepskin with wool extending beyond the edges of the pelt, the method and apparatus of the invention may be such that the fluid pressure sensing means detects only the pelt and does not respond to the wool extending beyond the edges.

Although the invention is particularly suitable for measuring the area of skins in which the wool extends beyond the pelt, it should be clearly understood that the invention is not limited to the measurement of dimensions of such skins.

THE DRAWINGS

The invention is described further by way of example with reference to the accompanying drawings in which:

FIG. 2 is a partial front view of the apparatus according to FIG. 1;

FIG. 3 is a perspective view showing a drive mechanism incorporated in the apparatus of FIGS. 1 and 2;

Figure 1:
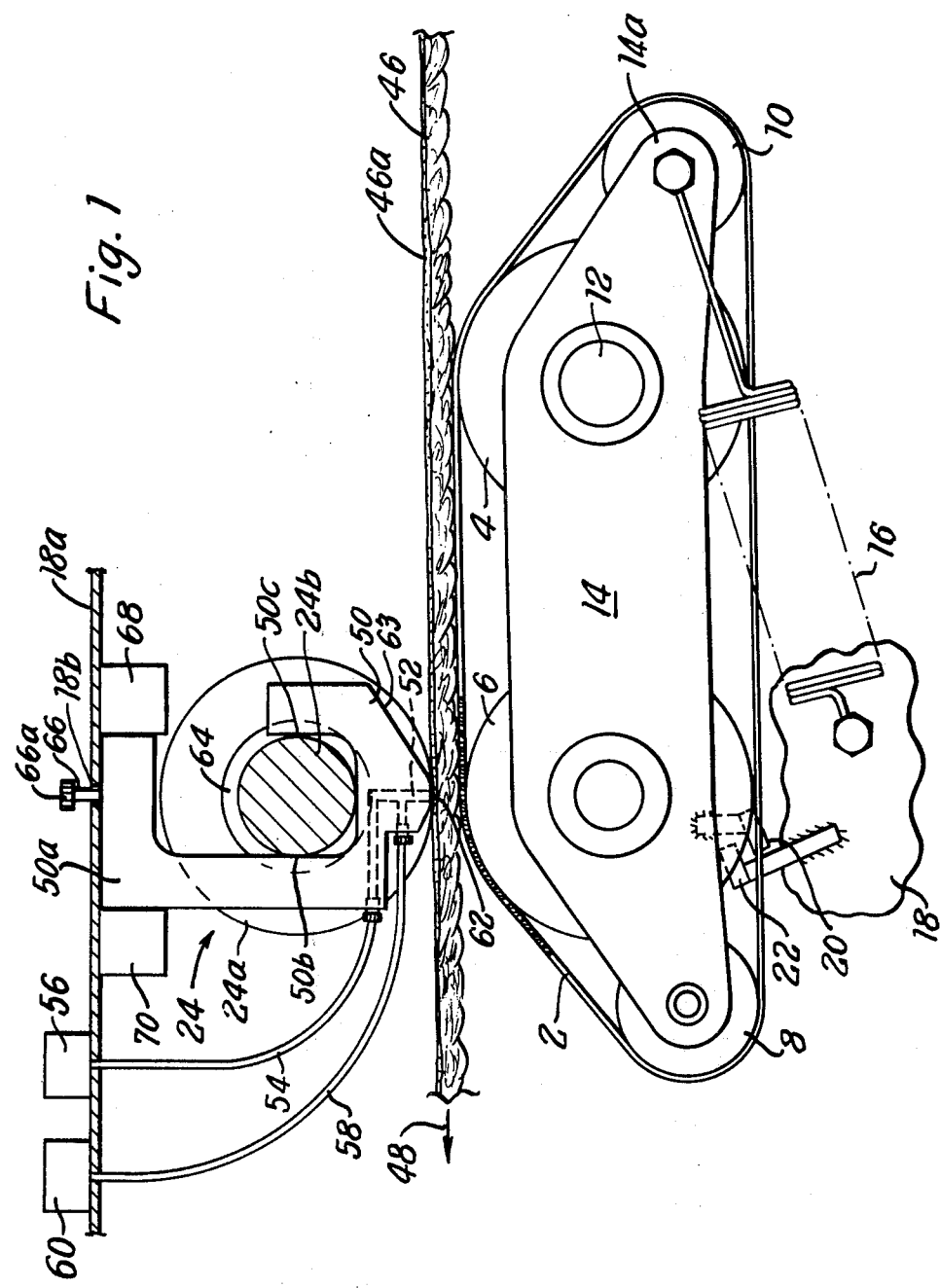
FIG. 1 is a diagrammatic side view of apparatus according to a preferred embodiment of the invention.

The apparatus shown in the accompanying drawings comprises a conveyor belt 2 which is constructed such that air may pass through it. For example it may be knitted from nylon. The belt 2 is mounted on rollers 4, 6, 8 and 10. Roller 4 is secured to an axle 12. Rollers 6, 8, and 10 are carried on arms 14 of which there is one at each end of the roller 4, although only one is visible in the drawings. The arms 14 are pivotally mounted on the axle 12, and a tension spring 16 extending between one end 14a of the arm 14 and a part of the frame 18 of the apparatus urges the arm 14 in the clockwise direction so that the roller 6 is consequently urged upwardly. A stop 20 mounted on the arm 14 co-operates with a further stop member 22 secured to the frame 18 to limit the pivoting of the arm 14 in the clockwise direction.

As seen in FIG. 2, the roller 6 is made up of a plurality of wheels 6a which are mounted at spaced positions on an axle 6b so as to leave spaces 6c between the wheels. The wheels 6a are securely fixed to the axle 6b.

An upper roller 24 also made up of wheels 24a securely fixed to an axle 24b, there being spaces 24c between the wheels 24a, is mounted above the roller 6 to form a nip 26 therewith through which the belt 2 passes.

A motor 28 (FIG. 3) drives the shaft 24b in the clockwise direction as shown in FIG. 1. The shaft 12 is driven in the anticlockwise direction as shown in FIG. 1 by means of a gear 30 mounted on the shaft 12 and in mesh with a gear 32 which is driven, from the shaft 24b, by a chain 34 passing over a sprocket 36 fixed to the shaft 24b and a sprocket 38 fixed to the gear 32. The gear 32 and sprocket 38 are rotatably mounted on the frame of the machine by means not shown. A further chain 40 passing over a sprocket 42 secured to the shaft 12 and a sprocket 44 secured to the shaft 6b drives the shaft 6b in the anticlockwise direction as viewed in FIG. 1. By virtue of the drive transmission illustrated in FIG. 3, therefore, the rollers 6 and 24, and the belt 2, are driven in such a manner that a skin 46 placed in the apparatus is conveyed through the apparatus in a direction to the left as shown by the arrow 48 in FIG. 1. To ensure that the speed at which the skin is conveyed is controlled exactly by the speed of rotation of the rollers 6 and 24, it is preferred that the peripheries of the wheels 6a and 24a should be such that the belt 2 and skin 46 are tightly gripped. For example rubber tires (not shown) may be provided on these wheels. The apparatus includes an arrangement for continuously sensing the width of the skin, as measured transverse to the direction of movement of the skin through the apparatus (i.e. parallel to the axles 24b and 6b) as the skin is transported through the apparatus by the rotation of the rollers 6 and 24. This arrangement comprises a plurality of air pressure sensing devices each including a jet member 50 containing a bore 52 which is supplied, via a conduit 54, with compressed air from a source 56. Conduits 58 also connect respective different ones of the bores 52 to respective different air pressure sensing switches 60.

The bore 52 in each element 50 opens in a lower face 62 thereof, which lower face is disposed at the nip 26. As can be seen in FIG. 2, there is a member 50 disposed in each of the spaces 24c between the wheels 24a. The members 50 are held central in the spaces by washers 64, preferably of nylon, to minimise friction between the wheels 24a and the members 50. Each member 50 is movable vertically relative to the axle 24b. Upward vertical movement is limited by engagement between an upper portion 50a of the member 50 and a portion 18a of the frame of the machine; and downward vertical movement is limited by the head 66a of a screw 66 which is secured to the portion 50a of the member 50 and passes through an aperture 18b in the portion 18a of the machine frame.

Each member 50 is, however, constrained against horizontal movement as seen in FIG. 1 by engagement of the portion 50a with guides 68 and 70 secured to the portion 18a of the machine frame 18 and by engagement between portions 50b and 50c of the member 50 and diametrically opposed points on the axle 24b, such engagement permitting vertical sliding movement of the member 50. As can be seen in FIG. 1, therefore, the members 50 are somewhat C- or G-shaped, which shape permits easy assembly and disassembly of the members 50 with the roller 24.

As can be seen from the drawings, therefore, when the skin 46 is transported between the rollers 6 and 24, the members 50 fall under their own weight downwardly into engagement with the skin 46. An inclined surface portion 63 is provided adjacent the surface 62 of the member 50 to ensure that, during this engagement, the skin can continue to move smoothly through the apparatus, without such movement being impeded by undue friction between the members 50 and the skin.

Figure 6:
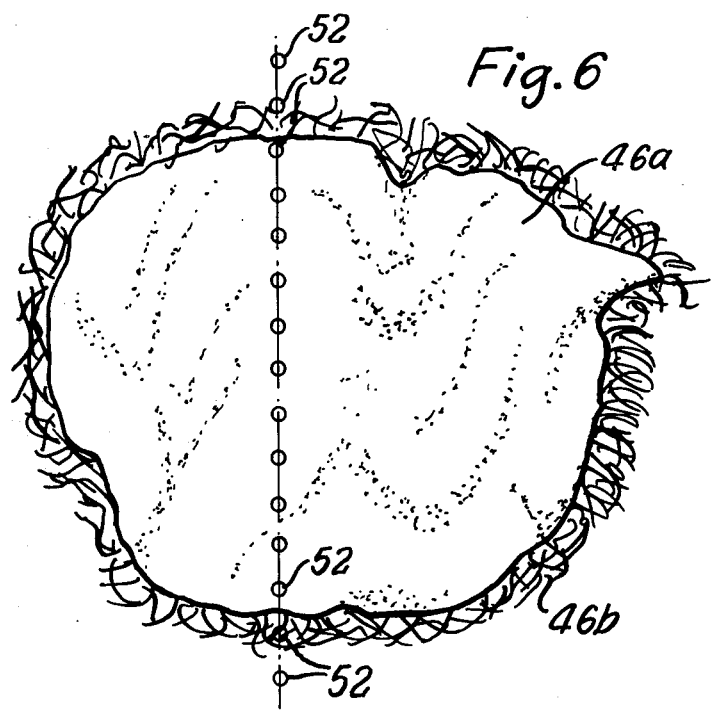
FIG. 6 is a plan view of a sheepskin which may be measured using the apparatus of FIGS. 1 to 5.

Any members 50 whose surface portions 62 engage the pelt 46a of the sheepskin 46 will, therefore, have the bore 52 closed off. The result will be an increase in pressure in the bore 52. This is transmitted via the associated conduit 58 to the switch 60 causing the switch to close. The sheepskin 46 also includes wool 46b which, as seen in FIG. 6, extends beyond the peripheral edge of the pelt 46a. Any surfaces 62 which are aligned with the wool 46b extending beyond the edges of the pelt 46a will, however, not be closed off since the wool will provide hardly any impediment to the air issuing from the bore 52. Also, any bores 52 aligned neither with the pelt 46a nor the wool 46b of the sheepskin 46 will not be closed off. Thus, as can be seen best from FIG. 6, it at any time the bores 52 which are closed off by the pelt 46a are detected, the number of such bores will be a representation of the width of the pelt 46a as measured parallel to the rollers 6 and 24.

Figure 4:
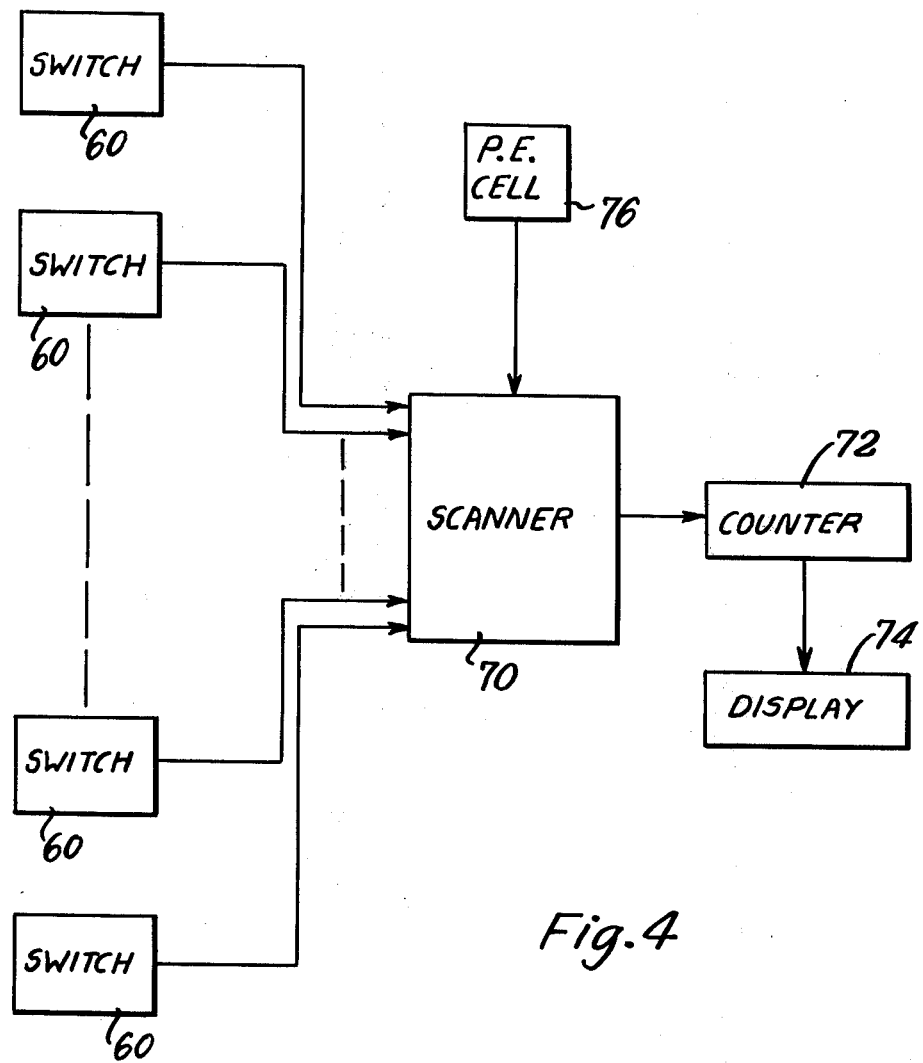
FIG. 4 is a block diagram of electronic circuitry included in the apparatus of FIGS. 1 to 3.

This detection is achieved with the circuit of FIG. 4. As seen, the switches 60 are connected to the input of a scanner 70 whose output is connected to a counter 72 which in turn is connected to a display device 74 which displays the contents of the counter. The scanner is activated by a signal from a photoelectric cell 76 and, each time a pulse is received from the cell 76, the scanner interrogates the switches 60 in turn, and each time a closed switch is encountered, a pulse is supplied from the scanner 70 to the counter 72. Thus, the number of pulses supplied to the counter 72 in each scan represents the width of the pelt 46a which at that particular time is in the nip 26.

Figure 5:
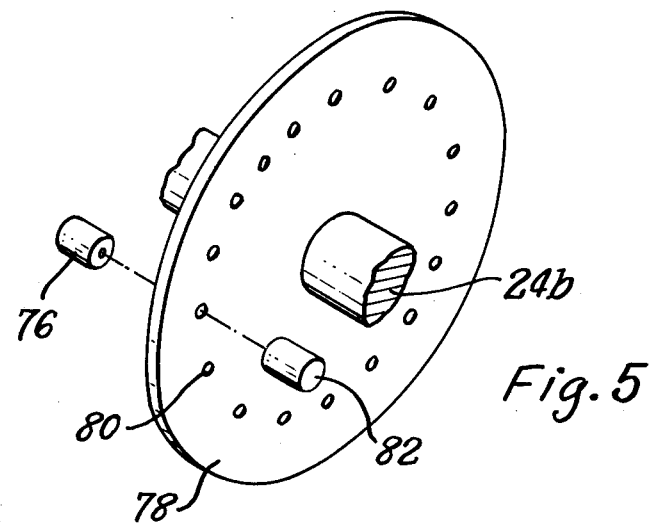
FIG. 5 is a perspective view of a further part of the apparatus of FIGS. 1 to 4.

As seen in FIG. 5, the photoelectric cell 76 is disposed on one side of a disc 78 having a plurality of apertures 80 in it. A light source 82 is located on the opposite side of the disc 78 such that light from the source 82 may pass through an aperture 80, to the cell 76, whenever such an aperture is located in alignment with the cell 76 and source 82. The disc 78 is secured to the shaft 24b and thus the disc 78 rotates with the roller 24. The spacing of the apertures 80 is such that each time the roller 24 has been rotated through an angular distance which advances the sheepskin 46 through unit distance, the cell 76 is activated to produce a pulse which is supplied to the scanner 70. The members 50 are also spaced apart by unit distance. Thus, as the apparatus is operated, the width of the pelt 46a is measured by the circuit of FIG. 4 each time the sheepskin is advanced by unit distance. The final total number of pulses counted by the counter 72 will therefore represent the area of the pelt 46a.

As a specific numerical example, the members 50 may be spaced apart by 0.1 of a foot, and the apertures 80 may be so arranged that a pulse is produced by the cell 76 for each 0.1 of a foot advance of the sheepskin 46. The diameter of the bores 52 may be within the range 0.030 inches to 0.060 inches and the air pressure supplied by the air pressure source 56 may be as low as less than 1 psig or as high as 20 psig or more. The degree of vertical movement of which the members 50 are capable may be about ½ inch; such vertical movement would normally be sufficient to accommodate non-uniformity in the thickness of each particular sheepskin. Thus, it will be understood, that the independent movement of the members 50 is to ensure that variations of thickness within a particular sheepskin do not result in misdetection of the area of the pelt, and the provision for vertical movement of the roller 6 is to enable sheepskin of different thickness to be measured in the machine.

Various modifications are possible within the scope of the invention. For example the belt 2 may be dispensed with in some embodiments in which case the stop 66 would be adjusted to ensure that the members 50 do not fall too far into the grooves or spaces 6c in the lower roller. Also, it may be possible to dispense with the spaces 6c in the roller 6. It is, however, important to ensure that those bores 52 which are not in engagement with the pelt 46a do not become closed off by engagement either with the belt 2 (which for this purpose has been described as perforate) or by engagement with the surface of the roller 6.

Although a photoelectric cell 76 has been shown for activating the scanner 70, other means could be employed, such as an air pressure sensing switch and an air jet located at opposite sides of the disc 78, or a mechanically operated switch.

If desired, in order to enable the apparatus to produce readings in different units, a scaling means may be incorporated, for example similar to that illustrated in FIG. 5 of the complete specification of our co-pending British Applications No. 59354/71 and 9843/73.

Although in the embodiment described, the conveyor belt 2, and rollers 4, 6 and 8 have been mounted on the movable frame 14 so that skins of different thickness can be accommodated, the upper roller being fixed, it would be possible to arrange for the lower roller to be at a fixed position, and the upper roller to be vertically movable to accommodate different thicknesses of skin. In this case, the range of movement of the jet members 50 may have to be greater than required in the illustrated embodiment, in order to accommodate the skins of different thickness in addition to accommodating any variations in thickness in each particular skin. The belt may be dispensed with, a previously described, and a feed table provided for feeding the workpieces through the machine, which table may have an opening in which the lower roller is located.

Although, measurement of area has been described, the invention is also applicable to measurement of length or width, which can be achieved by appropriate modification of the electronic circuitry. Furthermore, measurement of the thickness of the skin can be achieved by detecting the amount by which the upper and lower rollers are forced apart as the skin moves through the machine; in the embodiment illustrated, this measurement would be achieved simply by measuring the distance by which the roller 6 is forced downwardly utilising an appropriate transducer. Alternatively, particularly in the embodiment where the lower roller is fixed, and the upper roller movable to accommodate skins of different thickness, the distance through which each or some of the jet members 50 are raised could be measured with an appropriate transducer and used to obtain a measure of the average thickness of the skin.

In any of the embodiments, an automatic stamping device may be included, instead of or in addition to the output display 74, to stamp onto the skin the area, width or length, or thickness as measured on the apparatus.

As another alternative, instead of connecting the pressure sensitive switches 60 to the bores 52 in the manner shown, the switches could be connected to a chamber located below the path of movement of the sheepskin, in which case they would receive a high pressure signal when the pelt was not present and a low pressure signal when the pelt was present to block the air jets.

Although in the illustrated embodiment, there has been a single line of jets, it would be within the scope of the invention to provide a matrix of jets under which the workpiece would be placed and measurement of the area would be obtained without the need for scanning the workpiece.

As a still further embodiment, instead of directing the fluid towards the area which receives the workpiece using jets which produce streams of fluid at discrete zones along a line, a continuous air curtain along the line could be used. Individual sensors connected to individual collection chambers disposed on the opposite side of the workpiece may be employed in this embodiment.

In yet a further alternative, instead of sensing whether the air in each of the plurality of discrete zones defined by the jet members 50 is interrupted by the workpiece, it would be possible to arrange that such sensing is carried out at all points along a continuous line. For example, just a single jet could be employed and this could be caused to scan the workpiece by moving the jet backwards and forwards along a line, while advancing the workpiece in a direction transverse to that line. A counter could be caused to count while the jet is blocked and to stop counting while it is unblocked, thus producing a digital measure of the area of the skin; or instead an analogue measure could be obtained, for example by causing a capacitor to charge and to stop charging according to whether the end of the jet is open or blocked. Alternatively, a continuous air curtain could be directed towards the workpiece from one side and the air flowing past the workpiece may be collected into a single collection chamber connected to a single sensor, which collection chamber would be caused to scan the area in which the workpiece is disposed, in order to obtain a measure of the area of the workpiece (or other dimension such as width) by sensing the positions in which the air directed at the workpiece is prevented from reaching the collection chamber.

Although air under pressure has been supplied to the jet members, in the embodiments described, alternatively these jet members could be connected to a vacuum device, and the sensors would be arranged to detect a decrease in the pressure in the jet members instead of an increase in such pressure, such decrease arising due to the blocking off of the jets by the workpiece.

What is claimed is:

1. Apparatus for measuring the area of irregularly shaped, flexible workpieces comprising:
   a plurality of nozzles arranged in a row, each said nozzle having an orifice for the passage of a fluid therethrough;
   supporting means extending along said row of nozzles and in opposed relationship to said orifices, said supporting means being operative to support said workpiece in engagement with those of said nozzles which are aligned with said workpiece and to cause said workpiece to close the orifices of said aligned nozzles when in engagement with said workpiece;
   mounting means mounting said nozzles for movement independently of each other towards and away from said supporting means, said nozzles being biased towards said supporting means, and said supporting means being constructed and arranged so as not to close the orifices of any of said nozzles not aligned and in engagement with said workpiece;
   conveying means for conveying said workpiece while supported by said supporting means in engagement with said nozzles past said nozzles in a direction transverse to said row of nozzles and transverse to the direction of said movement of said nozzles;
   means for supplying pressure to each of said nozzles;
   a plurality of pressure sensors connected, respectively, to each of said nozzles, each said pressure sensor being responsive to pressure within the nozzle to which it is connected, and operable to assume a first state while the orifice of each said connected nozzle is not closed by engagement with said workpiece and a second state while said orifice is closed by engagement with said workpiece; and
   counting means operable to repeatedly count the number of said sensors in said second state while said workpiece is conveyed past said nozzles, whereby a measure of the area of said workpiece will be obtained upon completion of the conveying of said workpiece past said nozzles.

2. Apparatus according to claim 1 wherein said source of pressure is operable to provide super-atmospheric pressure.

3. Apparatus according to claim 1 wherein said source of pressure is operable to provide sub-atmospheric pressure.

4. Apparatus according to claim 1 wherein said supporting means comprises a member through which air may pass, said movement of said nozzles and said biasing of said nozzles being such that said nozzles engage said member in the absence of a workpiece being supported by said supporting means.

5. Apparatus according to claim 4 wherein said member is an air pervious belt, said row of nozzles extending transverse to said belt.

6. Apparatus according to claim 1 including limiting means limiting the movement of said nozzles towards said supporting means, said supporting means including a plurality of depressions, each said depression being disposed opposite each of said orifices, respectively, said limiting means preventing engagement of said orifices with the surfaces of said depressions in the absence of a workpiece being supported by said support means.

7. Apparatus according to claim 6 wherein said limiting means comprises an air pervious member covering said depressions.

8. Apparatus according to claim 1 wherein said conveying means comprises first and second conveyor members constructed and arranged to grip said workpiece to move said workpiece past said nozzles, said first and second members being movable towards and away from each other to accommodate workpieces of different thickness and wherein said first conveyor member comprises said supporting means.

9. Apparatus according to claim 8 wherein said first conveyor member is a lower member, and said biasing of said nozzles is by force of gravity.

10. Apparatus according to claim 8 wherein said second conveyor member comprises a first roller having a plurality of circumferential grooves therein, said nozzles being located, respectively, in said grooves.

11. Apparatus according to claim 10 wherein said first conveyor member comprises a second roller having a plurality of circumferential grooves therein, said grooves being disposed opposite said nozzles whereby said orifices are not closed in the absence of a workpiece being supported by said supporting means.

12. Apparatus according to claim 11 wherein said supporting means and conveying means further includes a conveyor belt mounted on said second roller, said conveyor belt being pervious to said fluid so as not to close said orifices in the absence of a workpiece being supported by said supporting means.

13. Apparatus according to claim 10 including stop means limiting the movement of said nozzles relative to said second conveyor member towards said first conveyor member.

* * * * *